United States Patent [19]

Benson

[11] Patent Number: 5,212,911
[45] Date of Patent: May 25, 1993

[54] ABRASIVE PARTICLE BLASTING DEVICE AND METHOD

[76] Inventor: Ronald C. Benson, P.O. Box 988, Minneapolis, Minn. 55458

[21] Appl. No.: 706,802

[22] Filed: May 29, 1991

[51] Int. Cl.$^5$ .............................................. B24C 3/00
[52] U.S. Cl. ...................................... 51/410; 51/425; 51/429; 51/437; 51/319
[58] Field of Search .................. 51/410, 428, 429, 436, 51/437, 424, 425, 319-321; 291/22-25, 38

[56] References Cited

U.S. PATENT DOCUMENTS

| | | | |
|---|---|---|---|
| 2,529,197 | 11/1950 | Storberg | 51/410 X |
| 2,763,965 | 9/1956 | Stokes | 51/410 |
| 2,978,856 | 4/1961 | Cook | 51/410 X |
| 3,034,263 | 5/1962 | McDaniel et al. | 51/437 |
| 3,461,478 | 8/1969 | Taylor | 51/410 X |
| 3,559,343 | 2/1971 | Foster | 51/410 |
| 3,611,639 | 10/1971 | Ashworth | 51/437 X |
| 4,019,284 | 4/1977 | Hileman | 51/436 X |
| 4,409,920 | 10/1983 | Hammelmann | 51/410 X |
| 5,010,694 | 4/1991 | Agbede | 51/410 X |

*Primary Examiner*—James G. Smith
*Attorney, Agent, or Firm*—Robert A. Elwell; Harold D. Jastram

[57] ABSTRACT

A modular device for abrasive particle blasting, a method of assembling a mobile abrasive particle blasting device, an apparatus for cleaning steel grit, and a method of cleaning steel grit are disclosed. The modular abrasive particle blasting device includes an abrasive particle storage component, an abrasive particle recovery component, and at least one subframe, adapted for carrying one of the components of the device. The subframe has a first vertical side defining a vertical boundary plane of the subframe and means for reversibly attaching the subframe at the vertical boundary plane to a second subframe structure. The reversible attachment between the first and second subframes is accomplished by providing a bolting pad on the vertical side for complimentary alignment with bolting pad on the adjoining subframe. A lifting attachment is also provided. An apparatus for cleaning steel grit includes a housing defining an enclosed space, an inlet into the housing, a vibrating perforated plate within the housing in line with the inlet, a first outlet of the housing, and a second outlet of the housing below the first outlet. Cleaning is accomplished by connecting the first outlet to a source of low pressure, feeding an entrained stream of grit, into the inlet of the apparatus, impacting the entrained stream of grit against the vibrating perforated plate to substantially dislodge any adhering dust from the grit.

15 Claims, 13 Drawing Sheets

ABRASIVE PARTICLE BLASTING DEVICE AND METHOD

BACKGROUND OF THE INVENTION

The present invention relates to abrasive particle blasting and in particular abrasive particle blasting by recycling of steel grit.

Abrasive blasting of steel structures, such as highway bridges, is a necessary step in maintenance of structures. In particular, abrasive blasting is a precursor to repainting of steel structures. One particular problem encountered with structures such as bridges is that the past painting history of the structure typically will include a lead-based paint. Abrasive blasting tends to liberate lead dust from such structures. Lead dust however, is considered quite toxic and is increasingly regulated. One approach to controlling environmental contamination from the lead dust resulting from abrasive blasting is to recover all of the dust resulting from an abrasive blasting procedure. If the abrasive blasting is accomplished using sand particles, the lead dust ends up mixed with the sand particles. This results in an undesirably high quantity of hazardous waste for subsequent disposal. A more desirable alternative is to employ a reusable steel abrasive particle. Steel is denser than sand and therefore more effectively retains blasting energy.

In the past, devices for accomplishing the entire process have typically been mounted on separate vehicles. That is, one vehicle may carry the blasting equipment, a second vehicle may carry the vacuum equipment, and a third vehicle may carry a compressor for providing high energy air.

SUMMARY OF THE INVENTION

The present invention includes a modular device for abrasive particle blasting, a method of assembling a mobile abrasive particle blasting device, an apparatus for cleaning steel grit, and a method of cleaning steel grit.

The modular abrasive particle blasting device of the present invention includes an abrasive particle storage component, an abrasive particle recovery component, and at least one subframe structure, adapted for carrying one of the components of the device. The subframe structure includes: A first vertical side defining a vertical boundary plane of the subframe and means for reversibly attaching the subframe at the vertical boundary plane to another component of the device. Preferably, a second subframe structure is provided which carries another component of the device. The second subframe also includes a vertical side defining a vertical boundary plane of the second subframe and means for reversibly attaching the second subframe at its vertical boundary plane to another component of the device. Preferably, the first and second subframe structures may be reversibly attached or mated to each other so as to adjoin their vertical boundary planes. The reversible attachment between the first and second subframes may be accomplished by providing a bolting pad carried at the vertical side and arranged on the vertical side for complimentary alignment with bolting pad on the adjoining subframe. Additionally, it is preferred to include means for lifting attachment on a subframe. For example, a clevis may be provided at the top of the subframe.

The subframes which have been reversibly attached or mated to each other may be lifted onto a rail of a trailer or other suitable longitudinal frame member. Subframes may be individually removed or replaced when mounted on a trailer or other similar longitudinal rail by detaching the means for reversible attachment to the trailer and any adjoining subframe and subsequently lifting out the subframe bearing the component.

A preferred modular abrasive particle blasting device includes an after cooler deliquescent dryer component mounted in a first subframe; a pressure vessel mounted to a second subframe, which is reversibly attached to the first subframe; a storage hopper with a top mounted classifier mounted to a third subframe which in turn is reversibly attached to the second subframe opposite the attachment to the first subframe; a preclassifier mounted to a fourth subframe which is reversibly attached to the third subframe opposite the attachment to the second subframe; and additionally, an induction vacuum dust collector mounted to a fifth subframe, the fifth subframe reversibly attached to the fourth subframe opposite the attachment to the third subframe. Most preferably, the five subframes are reversibly attached to a longitudinal rail, such as the frame of a trailer. Additional modules, such as a dust collector in a sixth subframe, a fan/engine module mounted in a seventh subframe may also be part of the assembly and reversibly joined to the subframes. The joining may occur before or after mounting of the initial components as a unit upon the longitudinal rail. Preferably, the longitudinal rail is part of a gooseneck-type trailer which may carry a positive displacement vacuum or an air compressor upon the gooseneck of the trailer.

The modular subframes of the device facilitate assembling a mobile abrasive particle blasting unit by reversibly attaching one or more subframes to each other in a desired configuration and lifting the assemblage of subframes onto a mobile lateral frame and reversibly attaching the subframes to the lateral frame.

The present invention also includes an apparatus for cleaning steel grit which has been used for abrasive blasting. As previously indicated, used steel grit which has been vacuumed for recovery immediately subsequent to abrasive blasting is accompanied by paint dust. The paint dust often may include a lead contaminant. Additionally, the lead dust may adhere to individual particles of the steel grit. An apparatus which cleans the steel grit includes a housing defining an enclosed space, an inlet into the housing, a vibrating perforated plate within the housing in line with the inlet, a first outlet of the housing, and a second gaited outlet of the housing below the first outlet. The apparatus enables a method of cleaning steel grit by connecting the first outlet to a source of low pressure, feeding an entrained stream of grit, which has previously been used for abrasive blasting, into the inlet of the apparatus, impacting the entrained stream of grit against the vibrating perforated plate at a velocity sufficient to substantially dislodge any adhering dust from the grit, and reducing the velocity and direction of the stream to eliminate the cleaned steel grit from the stream prior to passage of the entrained dust outward through the first outlet.

The present invention also includes a kit in which arrays of key component alteratives are provided, each having a subframe enabling interchangabilty. From such a kit, one may custom assemble abrasive blasting devices which are particularly suited to a surface treatment / abrasive blasting task by virtue of the ability to match capacities and important features of the components.

DETAILED DESCRIPTION OF THE PREFERRED EMBODIMENTS

Figure 1:
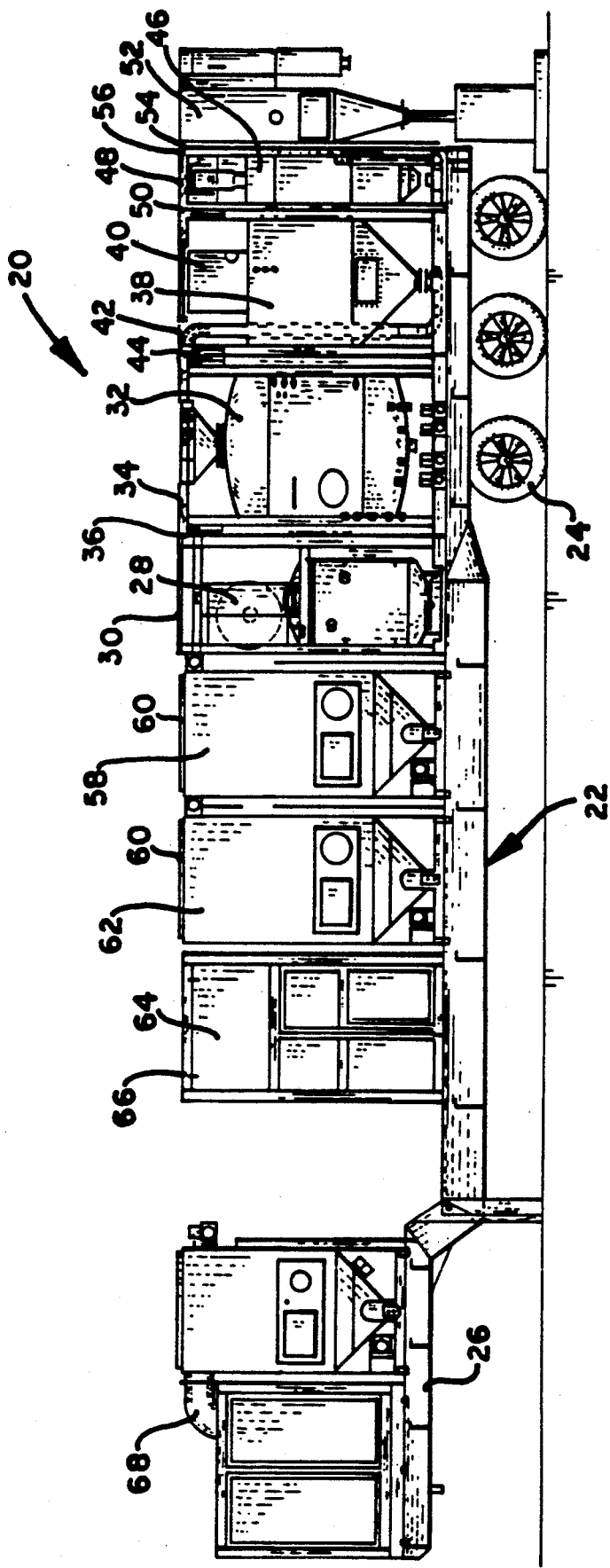
FIG. 1 is a side view of a modular abrasive particle blasting device.
Figure 2:
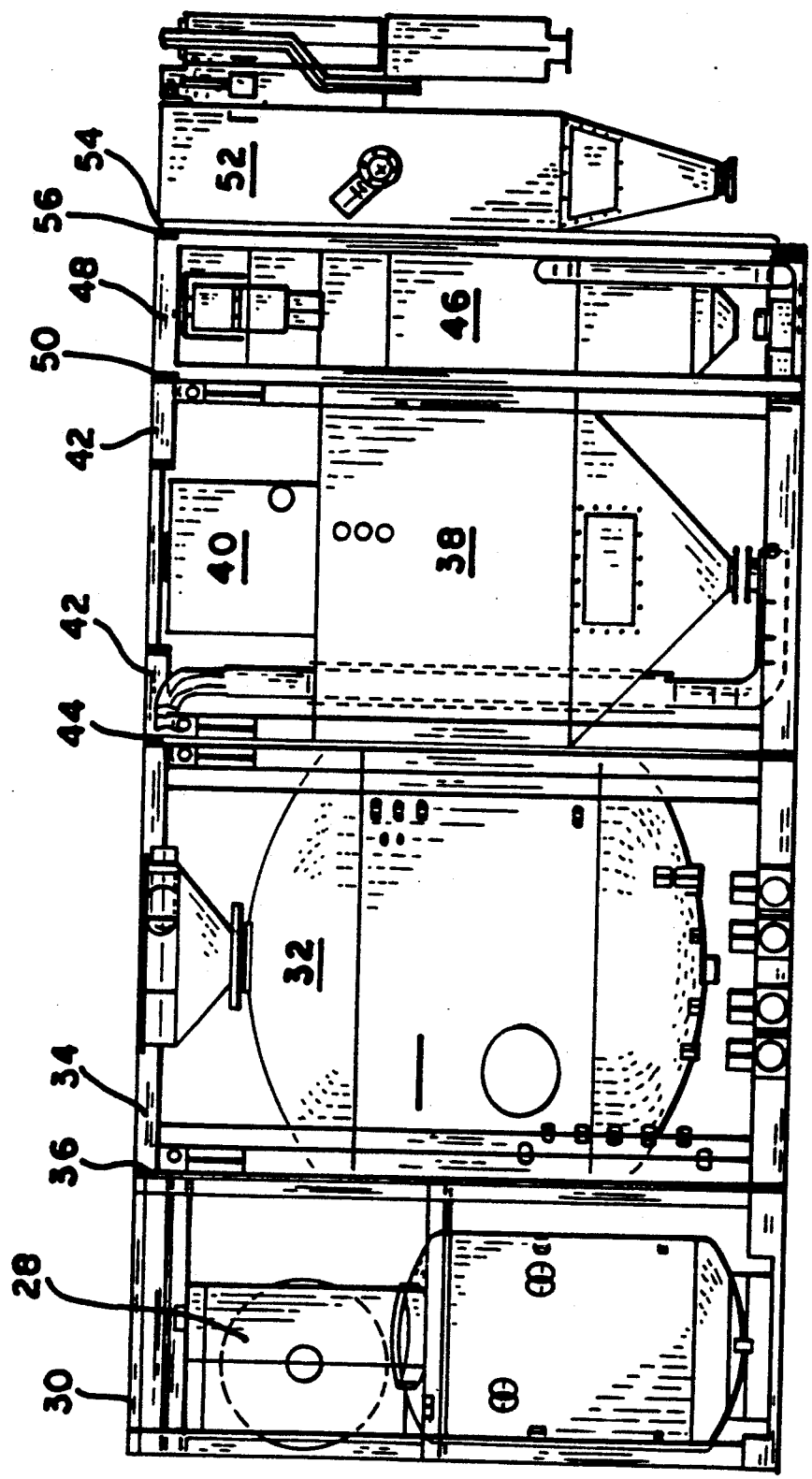
FIG. 2 is a side view of a portion of the device of FIG. 1 showing components in adjoining attached subframes.

In a first embodiment 20, as shown in FIG. 1, the present invention is a modular abrasive particle blasting device. The device 20 includes a trailer 22 which facilitates movement of the device 20 to a work site. The trailer has a plurality of wheels 24 and most preferably is a forty-eight foot triple axle, single drop semi-trailer. Preferably, the trailer 22 also includes a gooseneck 26. Alternatively, a skid, or pair of parallel rails or I-beams may be substituted for the trailer 22 facilitating use for marine or off-highway mobility.

Mounted upon the trailer 22 is an aftercooler deliquescent dryer component 28 mounted to a first subframe 30. A pressure vessel 32 mounted to a second subframe 34 which is reversibly attached to the first subframe 30 at a vertical plane 36 between the components 28 and 32.

A storage hopper 38 with a top mounted classifier 40 is mounted to a third subframe 42. The third subframe 42 is reversibly attached to the second subframe 34 opposite the attachment of the second subframe 34 to the first subframe 30. The third subframe 32 and the second subframe 34 are reversibly attached at a vertical frame 44 between the two adjoining subframes 34 and 42.

A preclassifier 46 is mounted to a fourth subframe 48. The fourth subframe 48 is reversibly attached to the third subframe 42 opposite the attachment of the third subframe 42 to the second subframe 34. The reversible attachment between the fourth subframe 48 and the second subframe 42 occurs at a vertical plane 50 where the fourth subframe 48 and the third subframe 42 adjoin each other.

An induction vacuum dust collector component 52 is mounted to a fifth subframe 54. The fifth subframe 54 and the fourth subframe 48 are reversibly attached at a vertical plane 56 where the two subframes 48 and 54 adjoin each other.

The just-described five components, when reversibly joined, form a solid unit which may be lifted onto or off of a longitudinal rail, such as the frame of trailer 22 for simple installation. The subframes 30, 34, 42, 48 and 54 serve to support the components of the device when lifted in such a manner and maintain the relationship between the components. However, once the grouping of five components has been reversibly attached to the trailer, one of the components may be separately removed without the necessity of removing the remaining components from the trailer 22. For example, by detaching the third subframe 42 carrying the storage hopper 38 with top mounted classifier 40, from the second subframe 34 at vertical plane 44 and the fourth subframe 48 at vertical plane 50. Additionally, it should be pointed out that any attachment between the third subframe 42 and the trailer 22 should also be detached. The subframe 42 may then be lifted vertically or horizontally out of its relationship with adjoining components for repair, replacement or substitution of an alternative component.

As further shown in FIG. 1, a first dust collector 58 in a sixth subframe 60 and a second dust collector 62 in a similar subframe 60 may be reversibly attached to the forward side of the first subframe 30, that is opposite the attachment of the first subframe 30 to the second subframe 34. Subframe 60 may also be reversibly attached to the trailer 22.

A fan/engine module 64 in a seventh subframe 66 may be mounted forward of the dust collectors 58 and 62 by reversible attachment to the forwardmost subframe 60 and additionally reversibly attached to the trailer 22. In a preferred embodiment, a positive displacement vacuum 68 is carried on the gooseneck 26 of the trailer 22. In an alternative embodiment, an air compressor may be substituted for the positive displacement vacuum 68. Thus, the present invention offers a method of assembling a mobile abrasive particle blasting device from a group of components by carrying out the steps of providing a first component, such as, for example, the aftercooler deliquescent dryer component 28 mounted in the first subframe 30 and providing a second component, such as, for example, the pressure vessel 32 mounted to subframe 34. Next, a reversible attachment is made between the subframe 30 and the second subframe 34. Optionally, additional components in additional subframes are also reversibly attached to the combination of the first subframe and the second subframe. Finally, the assembly is completed by lifting of the attached first and second subframes 30 and 34 bearing components 28 and 32 (and any additional components/subframes which have been reversibly added) onto a mobile lateral frame, such as trailer 22, and reversibly attaching the subframes 30 and 34 to the lateral frame.

Figure 3:
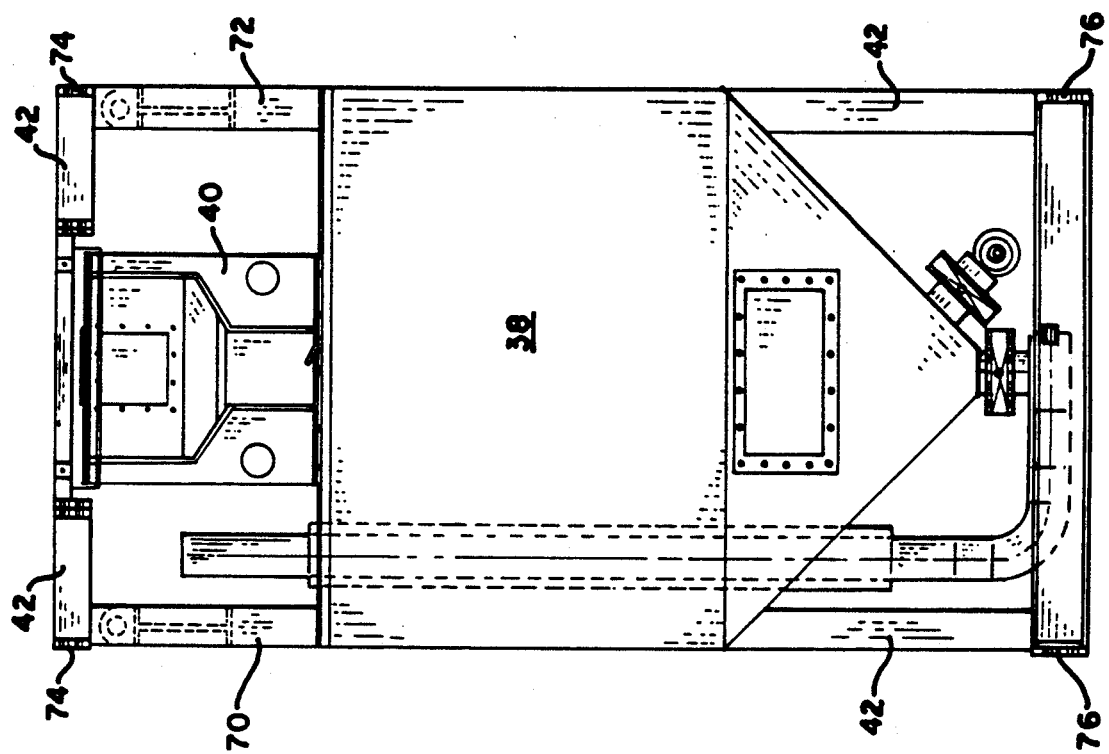
FIG. 3 is a side view of the storage hopper component of FIG. 1 with classifier and subframe.
Figure 4:
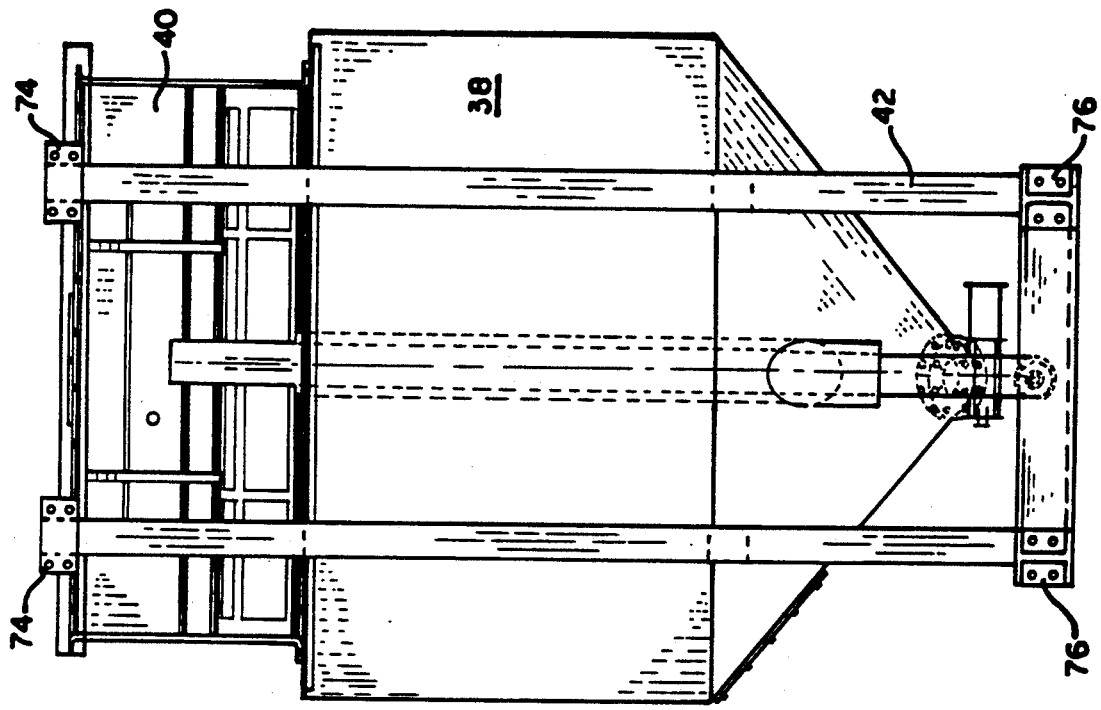
FIG. 4 is an end view of the storage hopper component, classifier and subframe of FIG. 3.
Figure 5:
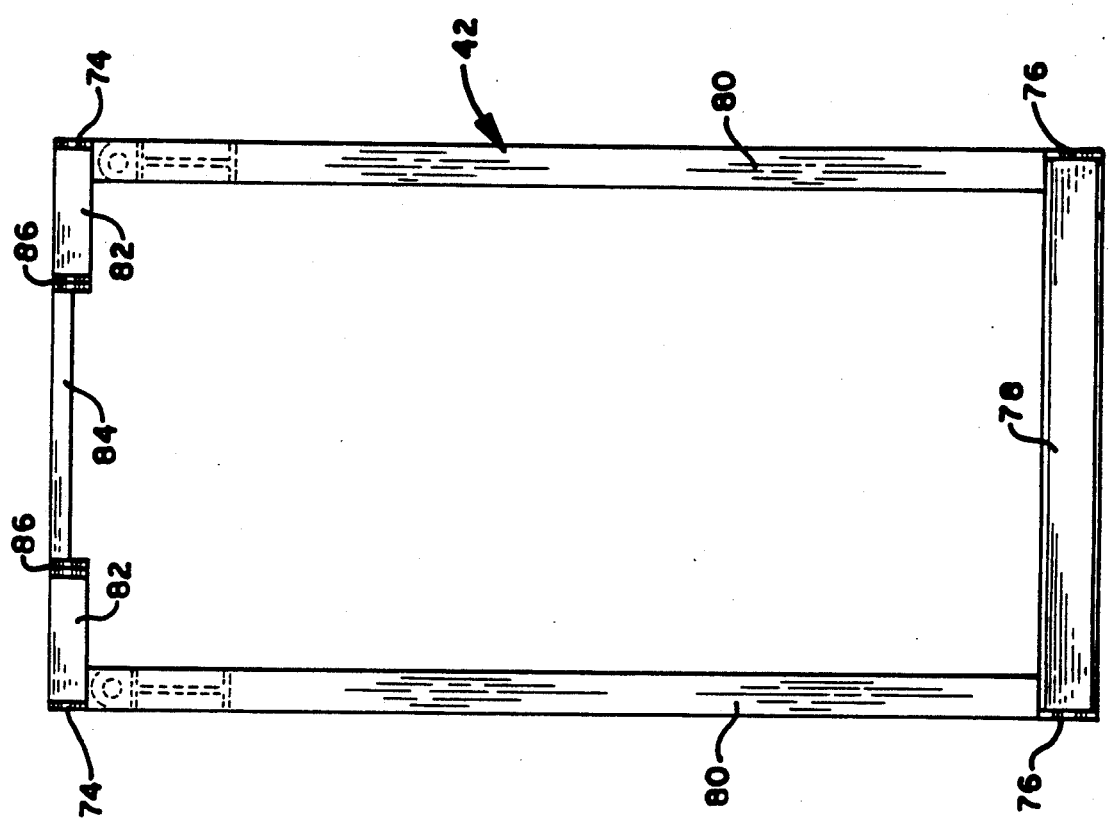
FIG. 5 is a side view of the subframe of FIGS. 3 and 4.
Figure 6:
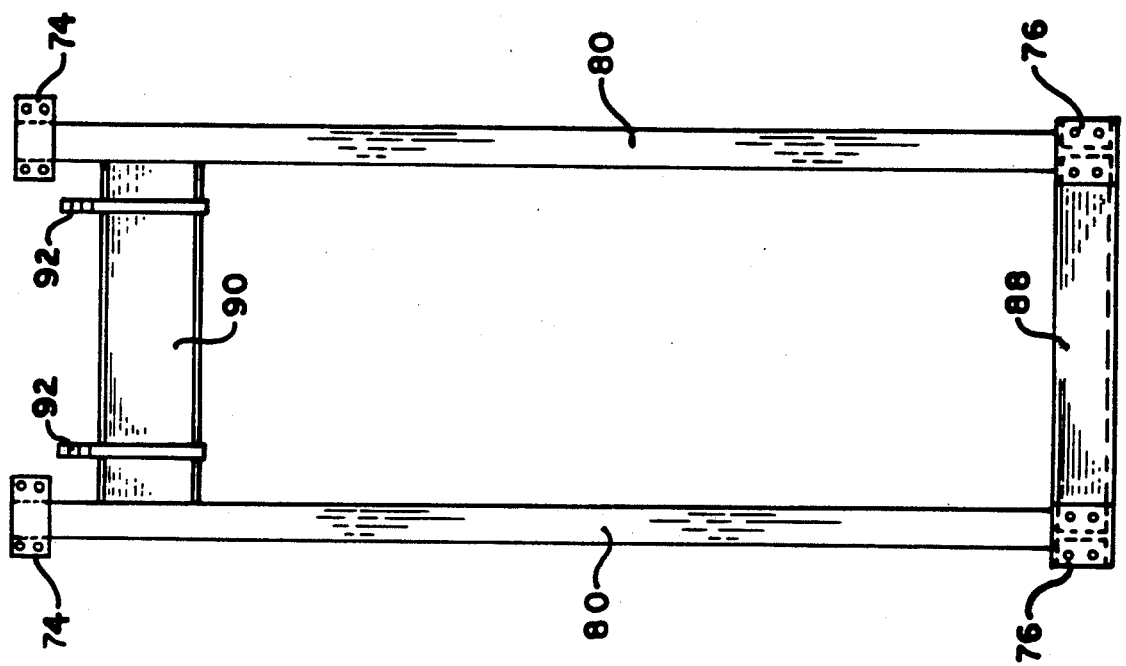
FIG. 6 is an end view of the subframe of FIG. 5.
Figure 7:
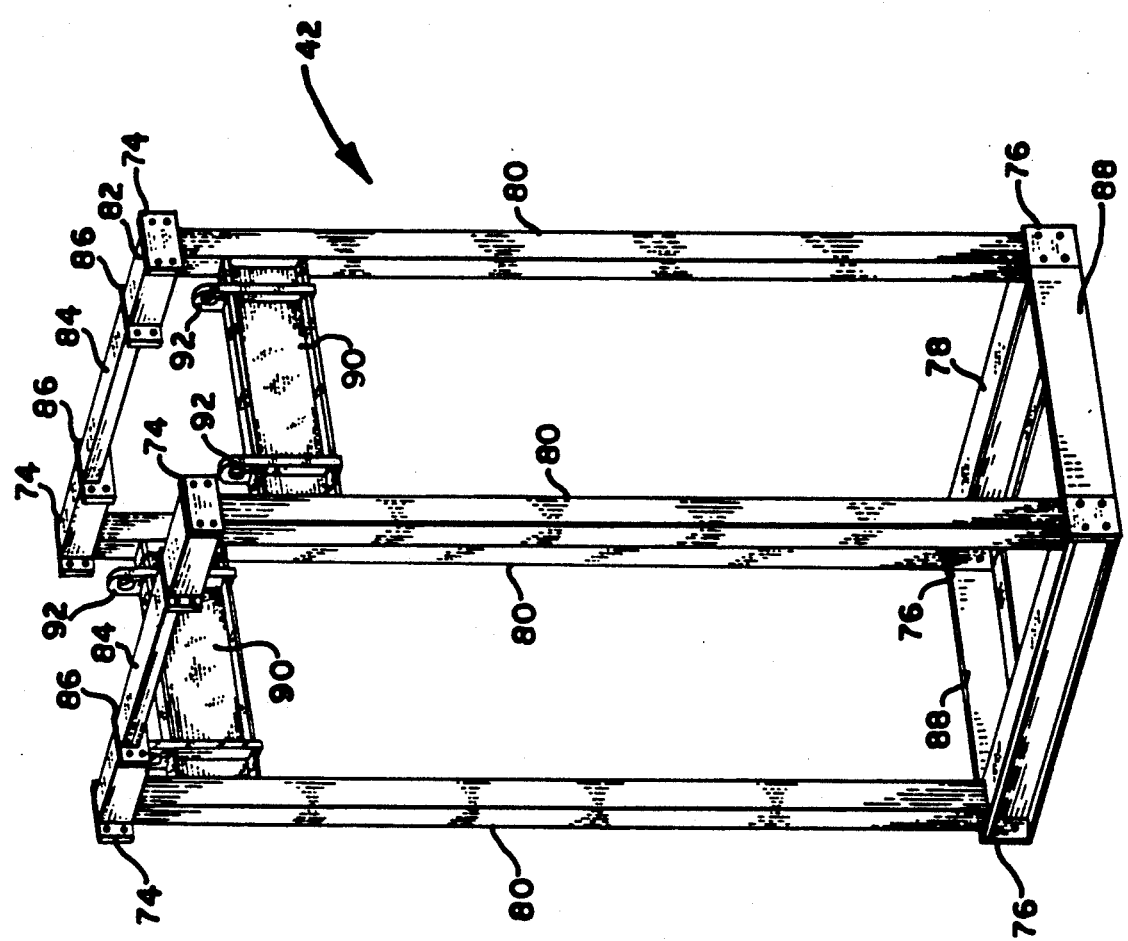
FIG. 7 is a perspective view of the subframe shown in FIGS. 5 and 6.

Details of the component and subframe assemblies may be understood with reference to FIG. 3 which shows the storage hopper component 38 and the top mounted classifier 40 within the subframe 42. Subframe 42 has a first vertical side 70. The first vertical side 70 defines a vertical boundary plane 44 of the subframe 42. The subframe 42 also has a second vertical side 72 defining a second vertical boundary plane 50 of the subframe 42. Adjacent the upper corners of the subframe 42 are upper boltpads 74. Adjoining the lower corners of the subframe 42 are lower boltpads 76. As shown in FIG. 4, the upper boltpads 74 and the lower boltpads 76 each include four apertures for receiving bolts. The arrangement and orientation of the boltpads 74 and 76 at the vertical boundary plane 70 are substantially identical to those at the vertical boundary plane 72. Similar arrangements are provided on other subframes of the system, such as the subframe 34 of the pressure vessel 32. Placing subframe 42 in a complementary alignment adjoining the vertical plane of another subframe, such as, for example, subframe 34 or subframe 48 facilitates reversible attachment between subframes by insertion of preferably four bolts through each of the complementary boltpads 74 and 76 such that a total of sixteen bolts serve to reversibly attach subframe 42 to subframe 34. Similarly, another sixteen bolts are used to reversibly attach the boltpads 74 and 76 to similarly arranged boltpads on subframe 48. FIG. 5, by way of example, depicts the subframe 42 without the storage hopper 38 or top mounted classifier 40. The subframe 42 includes two parallel spaced-apart base members 78. Preferably, the spacing between the base members 78 is such as to generally align with longitudinal frame members of the trailer 22. Preferably, the base members 78 may be cut from I-beams. The base members 78 have lower boltpads 76 on each end. Vertical corner members 80 are welded to the base members 78 adjacent the boltpads 76 and terminate at their upper extent near upper boltpads 74. Preferably, the vertical corner members 80 are formed from angle iron. Preferably, the height of the corner members 80 is about 9.5 feet, so as to allow passage of the device under a standard 13.5 inch bridge when loaded on a 4 foot trailer. Such a corner member 80 size also results in a subframe which conviently packs within a standard shipping container for export. Extended between the forward directed and rearward directed upper boltpads 74 is an upper member 82. Preferably, upper member 82 is cut away and a connecting member 84 terminating on each end in boltpads 86 allow for removal of the connecting member 84 in order to facilitate removal of the classifier 40. As shown in FIG. 6, proper spacing to match the rails of trailer 22 is provided by lower lateral members 88 and upper lateral members 90 are upward extending hooks or eyes 92 which facilitate lifting by a crane. Preferably, the lifting members 92 are eyes which may be used in conjunction with clevises. When lifting a group of attached components, it is generally preferred to use the eyes 92 which are spaced furthest forward and furthest backward to assist in stabilizing the attached members when lifting.

Figure 8:
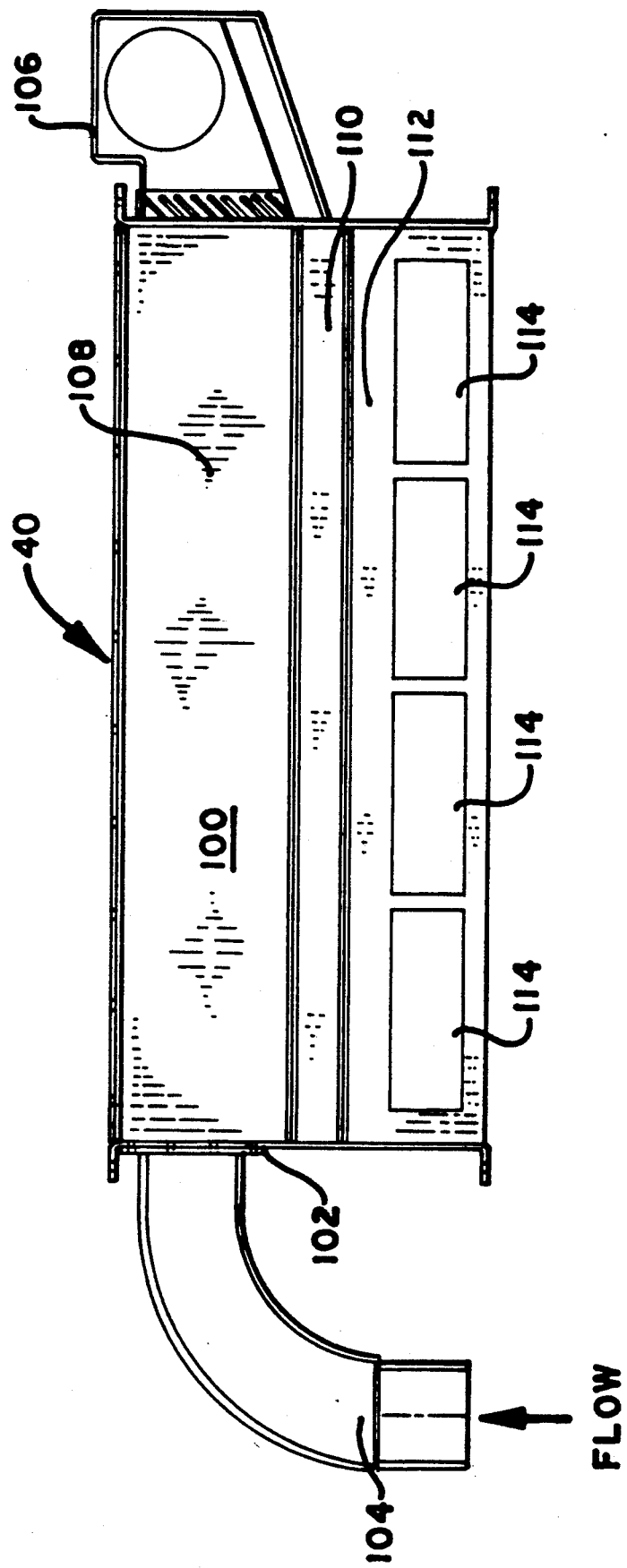
FIG. 8 is a front view of the classifier of FIG. 3.
Figure 9:
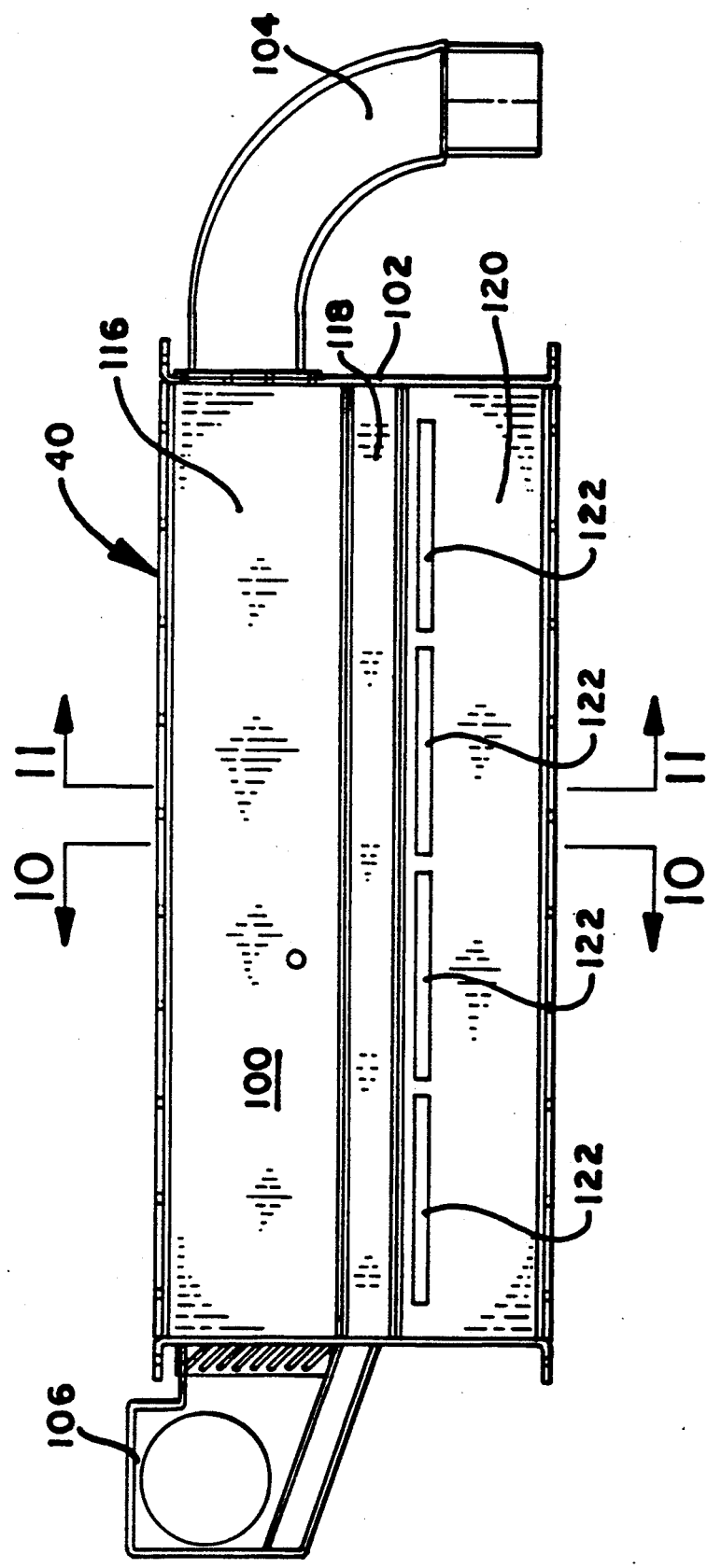
FIG. 9 is a rear view of the classifier of FIG. 3.

The classifier 40 as shown in FIG. 8 includes a housing 100. The housing 100 defines an enclosed space. Attached to the housing 100 at a first end 102 is an inlet structure 104. At the opposite end is an outlet structure 106. The front side of the housing 100 includes an upper vertical wall 108, an inward directed angular wall portion 110 and a lower vertical wall 112. A plurality of apertures 114 are present in the lower wall 112. A plenum cover (not shown) preferably is placed over the lower wall 112 so as to control flow through the apertures 114.

The rear side of the classifier 40 has a vertical upper wall 116, an inward angled wall 118 and a lower vertical wall 120. A series of apertures 122 are present in the lower vertical wall 120 generally adjacent its connection to the inward directed angular wall 118.

Figure 10:
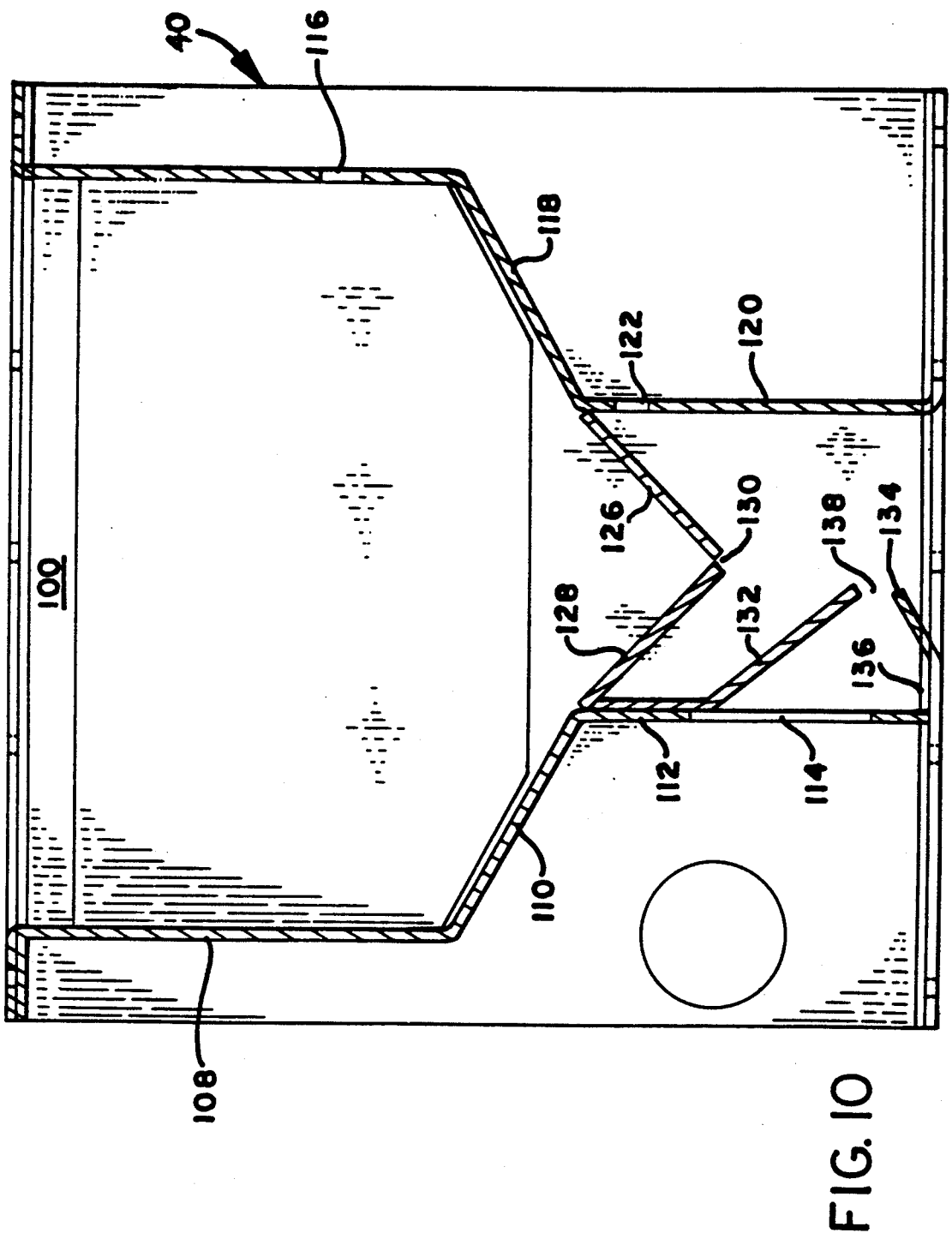
FIG. 10 is a sectional view at 10—10 of FIG. 9.
Figure 11:
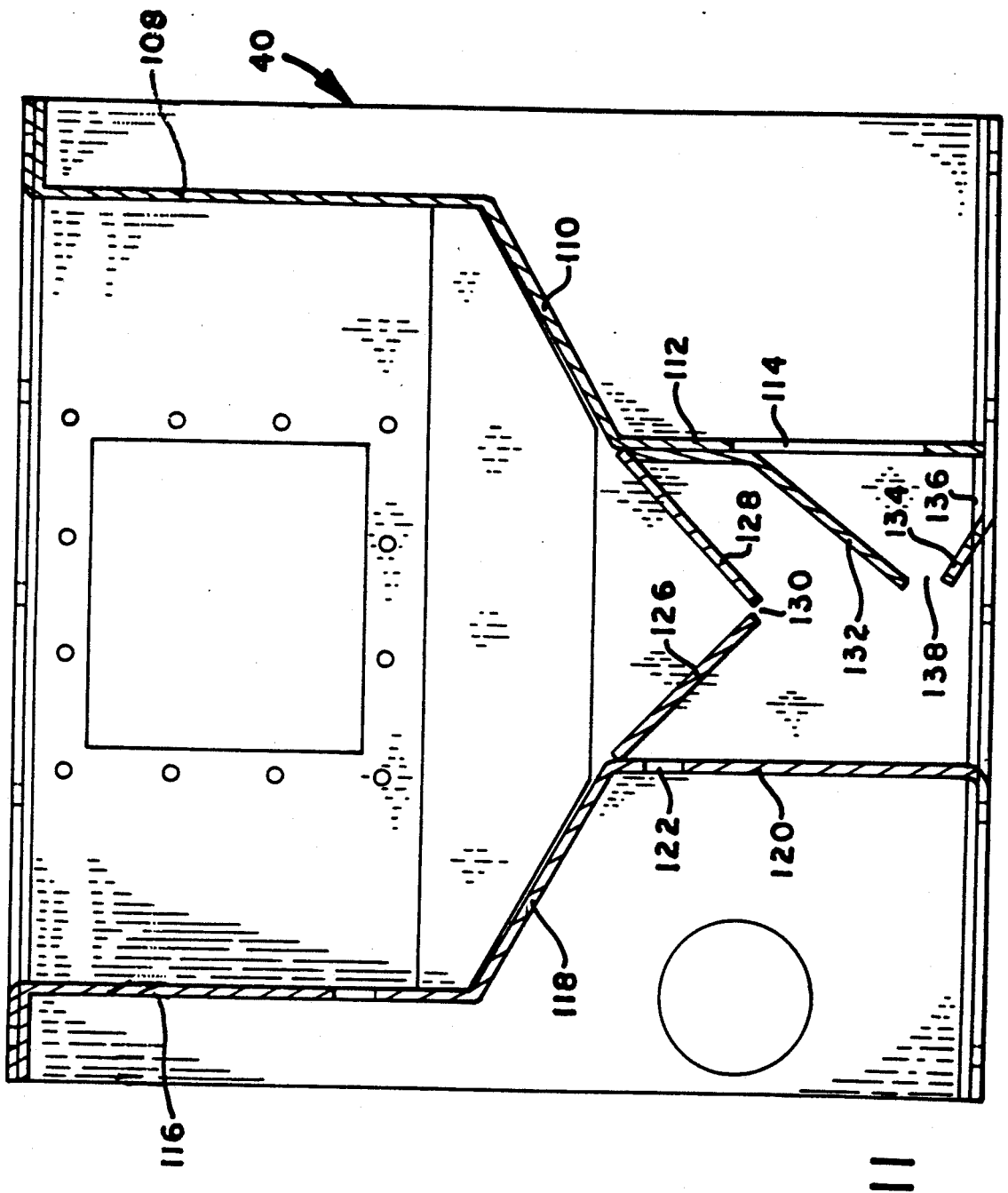
FIG. 11 is a sectional view at 11—11 of FIG. 9, with portions removed.
Figure 12:
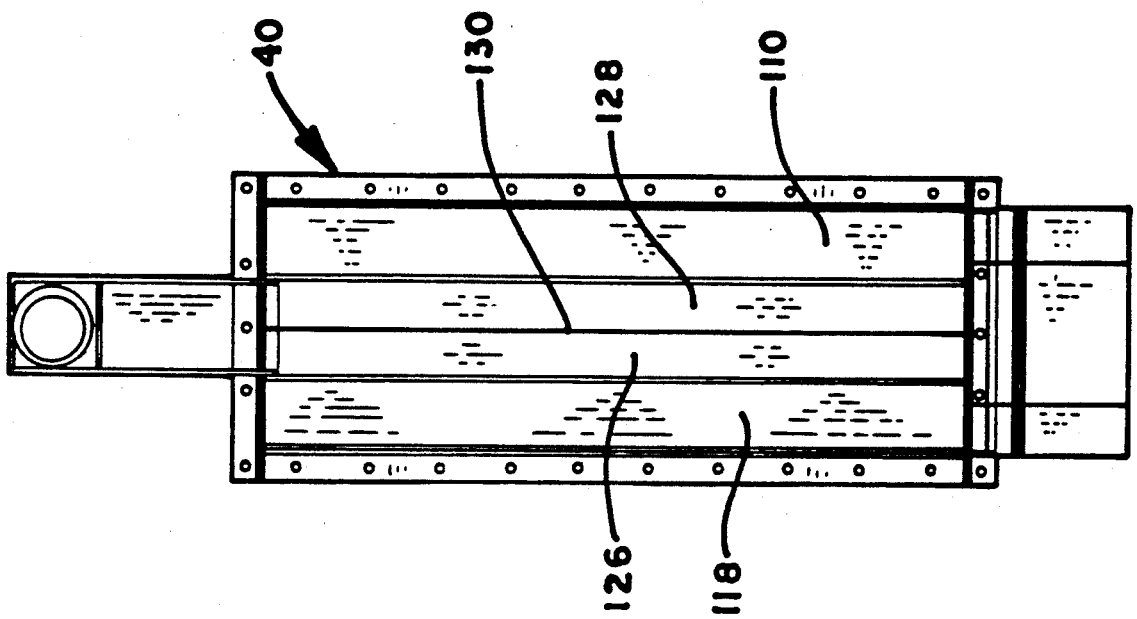
FIG. 12 is a top view of the classifier of FIG. 3 with portions removed.

As shown in FIG. 10, inward directed vertical wall 118 is generally extended into the enclosed space of the housing 100 by flange 126 and inward directed angular wall 110 is extended by flange 128. Flanges 126 and 128 do not meet but rather provide a slot 130. A second flange 132 is spaced apart from and lies generally parallel to and under flange 128. Flange 132 therefore tends to obscure or obstruct access from the apertures 114 to the slot 130. A small guide flange 134 arises from the base 136 to form a slot 138 with obstructing flange 132.

Figure 13:
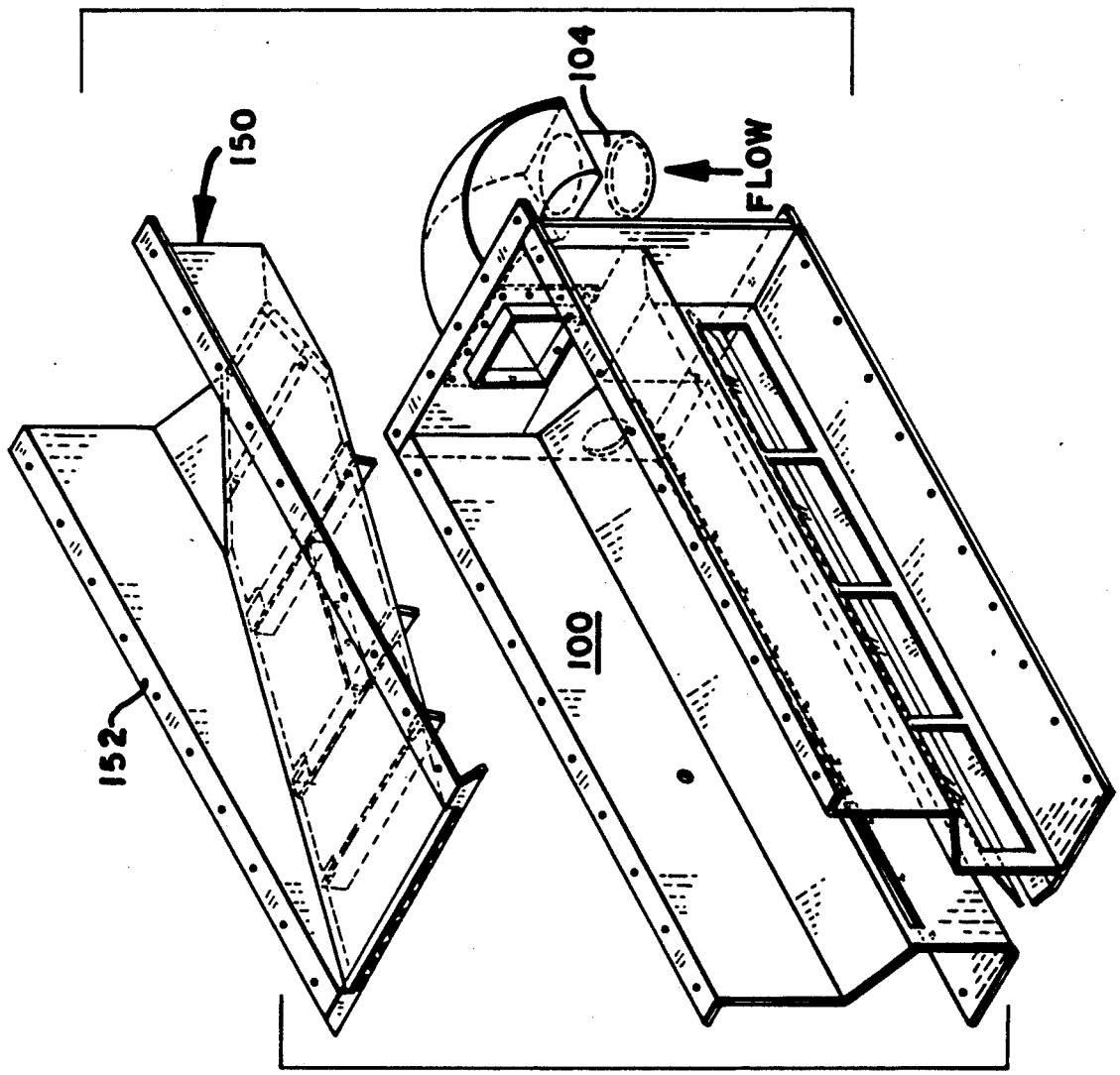
FIG. 13 is an exploded perspective view of the classifier of FIG. 3.

As shown in FIG. 13, a perforated vibrating screen 150 is mounted so as to intercept the inward directed flow through the inlet structure 104. The screen includes a frame 152 supported by the housing 100. The most preferred screen is steel sheeting of a thickness of about 0.092 inches with a plurality of 4.5 mesh apertures. Attached to the lower reaches of the frame 152 is a vibrator. Preferably, the vibrator is a Cleveland air vibrator such as, for example, Model VBC. Such a vibrator vibrates from between about 3,600 vibrations per minute to about 7,500 vibrations per minute depending on the air pressure supplied. This provides a vibrating force of from about 129 lbs. to about 560 lbs. Preferably, a pair of air vibrators are mounted on the frame 152. The vibrators serve to shake the screen.

Incoming steel grit is entrained along with dust. If the job site has included the removal of lead-based paint from a surface being prepared for subsequent painting, the dust may include lead particulates. Additionally, the steel grit may have some lead dust adhering to the steel grit. The incoming steel grit impacts against the vibrating screen with a force sufficient to dislodge the adhering dust from the steel grit. Light materials, such as feathers or grass, are also maintained on the screen. The dust and steel grit generally pass through the screen. The steel grit tends to maintain its downward directed velocity from passage through the screen and proceeds towards and ultimately through the slot 130 lower in the enclosed space of the housing 100.

Additional cleaning of the steel grit is accomplished by air flow which is directed inward through a plenum thence through the apertures 114. This additional air flow proceeds through lower slot 138 blowing any dust inadvertently settling through slot 130 in the direction of upper apertures 122. Apertures 122 are covered by a plenum such that the secondary cleaning area of the classifier is collected along with the dust from the outlet structure 106 for subsequent collection and ultimate handling as hazardous waste. The twice cleaned steel grip eventually exits through the gated lower surface of the classifier to enter the storage hopper.

A distinct feature of the cleaning process is that the entire cleaning operation is occurring at sub-atmospheric pressures, such as for example, vacuum pressures of up to 16 inches of mercury.

Although the present invention has been described with reference to the preferred embodiments, workers skilled in the art will recognize that changes may be made in form and detail without departing from the spirit and scope of the invention.

What is claimed is:

1.) A modular abrasive particle blasting device comprising:
   an abrasive particle storage component;
   an abrasive particle recovery component;
   at least one subframe structure, adapted for carrying one of the storage or the recovery components of the device, the subframe structure including:
      a first vertical side, the vertical side defining a vertical boundary plane of the subframe; and
      means for reversible attaching of the subframe structure at the vertical boundary plane to the other of the storage or the recovery component of the device.

2.) The modular abrasive particle blasting device of claim 1 and further comprising:

a second subframe structure, adapted for carrying another component of the device, the second subframe structure including:
  a vertical side, the vertical side defining a vertical boundary plane of the second subframe; and
  means for reversible attaching of the second subframe at vertical boundary plane to another component of the device.

3.) The modular abrasive particle blasting device of claim 2 and wherein the means for reversible attaching of the first and second subframes enable attachment between the vertical boundary plane of the first and second subframes.

4.) The modular abrasive particle blasting device of claim 3 and wherein the means for reversible attaching of the first and second subframes includes a bolting pad carried by the vertical sides and arranged on the vertical side of each of the subframes for complementary alinement when the vertical planes of the subframes are adjoining.

5.) The modular abrasive particle blasting device of claim 1 and wherein the subframe further includes:
  a second vertical side parallel to the first vertical side, the second vertical side defining a second vertical boundary plane of the subframe; and
  means for reversible attaching of the subframe structure at the second vertical boundary plane to another component of the device.

6.) The modular abrasive particle blasting device of claim 1 and further comprising:
  means for lifting attachment on the subframe.

7.) The modular abrasive particle blasting device of claim 6 and wherein the means for lifting includes a clevis attached to the subframe.

8.) The modular abrasive particle blasting device of claim 1 and further comprising:
  a trailer, suitable for carrying the components; and wherein the subframe further includes:
  means for reversible attachment to the trailer.

9.) A modular abrasive particle blasting device comprising:
  an aftercooler deliquescent dryer component mounted to a first subframe;
  a pressure vessel mounted to a second subframe, the second subframe reversibly attached to the first subframe;
  a storage hopper with a top mounted classifier mounted to a third subframe, the third subframe reversibly attached to the second subframe opposite the attachment to the first subframe;
  a preclassifier mounted to a fourth subframe, the fourth subframe reversibly attached to the third subframe opposite the attachment to the second subframe;
  an induction vacuum dust collector mounted to a fifth subframe, the fifth subframe reversibly attached to the fourth subframe opposite the attachment to the third subframe.

10.) The modular abrasive particle blasting device of claim 9 and further comprising:
  a longitudinal rail, reversibly attached to the underside of at least one of the subframes.

11.) The modular abrasive particle blasting device of claim 9 and further comprising:
  a dust collector mounted to a sixth subframe, the sixth subframe reversibly attached to the first subframe opposite the attachment to the second subframe.

12.) The modular abrasive particle blasting device of claim 11 and further comprising:
  a fan/engine module mounted to a seventh subframe, the seventh subframe reversibly attached to the sixth subframe opposite the attachment to the first subframe.

13.) The modular abrasive particle blasting device of claim 10, wherein the trailer has a gooseneck and further comprising:
  an air compressor carried on the gooseneck of the trailer.

14.) The modular abrasive particle blasting device of claim 10, wherein the trailer has a gooseneck and further comprising:
  a positive displacement vacuum carried on the gooseneck of the trailer.

15.) A kit for abrasive blasting comprising:
  an array of pressure vessels, each of the pressure vessels having a subframe;
  an array of storage hoppers, each of the storage hoppers having a subframe;
  an array of classification devices, each of the classification devices having a subframe;
  and wherein the subframes may be reversibly attached to each other thereby enabling assembly of a plurality of alternative abrasive blasting devices having distinct capacities.

* * * * *